Patented May 31, 1949

2,471,600

UNITED STATES PATENT OFFICE 2,471,600

METHOD OF MAKING FURFURYL ALCOHOL RESINOUS PRODUCTS AND THE PRODUCT

William H. Adams, Jr., and Hans H. Lebach, Newark, Del., assignors to Haveg Corporation, Newark, Del., a corporation of Delaware No Drawing. Application November 29, 1944, Serial No. 565,808

12 Claims. (Cl. 260—88.5)

1

The present invention relates to novel processes of making synthetic resinous products from furfuryl alcohol containing materials selected from the group consisting of furfuryl alcohol and a mixture of furfuryl alcohol and not more than about 15% of furfural and to the resins of advantageous properties obtained thereby, and more particularly it relates to processes for the preparation of resins from the said furfuryl alcohol-containing materials by which substantially completely condensed and polymerized infusible, insoluble furfuryl alcohol resins may be produced, in the preparation of which the conversion from the initial soluble stage to the final, insoluble stage is controlled so that sufficient time is afforded to permit the initial resinous product to be molded or otherwise worked. For convenience hereinafter, reference will be made merely to furfuryl alcohol and furfuryl alcohol condensation products. This application is filed as a continuation-in-part of our copending application Serial Number 511,600, filed November 24, 1943 (now abandoned).

While resins made by the condensation of furfuryl alcohol in the presence of an acid catalyst are known and when satisfactorily polymerized, these resins are characterized by hardness, toughness, and chemical resistance, they have not been employed commercially to any extent due primarily to the difficulty of controlling the reaction. Thus, when a strong acid is used as the catalyst in a sufficient amount to give a substantially completely condensed and polymerized resin, the resin will not remain in a moldable form for sufficient time to permit working thereof; in fact, the mass hardens spontaneously within an hour or two, and in some cases within a few minutes. On the other hand, when the catalyst is a weak acid or where strong acid is used in very small amounts the working time may be sufficient, but the resin is incapable of developing a substantially complete cure, and will, therefore, not have certain desired properties, as shown, for example, by its lack of substantially complete insolubility, by the low hot strength of the product and by the tendency of the product to soften at elevated temperatures.

It has been found that initial non-reactive reaction products of furfuryl alcohol may be prepared by condensation of the furfuryl alcohol with acid, followed at the proper point by removal of sufficient acid, for example, by neutralization with alkali, so that the initial resin is no longer convertible. Such neutral resins of insufficient acidity to be convertible again become reactive

2 when a new portion of acid is added and are then convertible into the infusible, insoluble stage. For this reason, such products may be termed two-stage resins. The same difficulties, however, are present in the curing of these resins as are encountered in the case of the one-stage resins where there is only one addition of acid.

Large molded articles have been successfully prepared by mixing phenolic resins in the initial stage and asbestos together to form a pasty composition. The composition is then filled into molds or forms of sheet metal, wood or the like by rolling, spinning, tamping or otherwise forming at room temperature. The molds used in this process normally follow only one contour of the article to be manufactured, leaving the other one open. After the molds have been filled at room temperature, they are placed in an autoclave and baked, sometimes under pressure, to cure the resin, following which the hardened objects are removed and finished by sanding, lacquering, and machining where required. This procedure is described in "The Chemistry of Synthetic Resins" by Carleton Ellis, Reinhold Publishing Company, 1935, pp. 458; 1332 and is very important commercially because it permits the manufacture of large objects without the necessity for expensive molds, hydraulic presses and other equipment. The corrosion resistance of the phenolic resins has permitted the use of the articles in commercial chemical equipment, such as tanks, towers, pipes, fume ducts, valves and many other items.

The use of furfuryl alcohol resins, if they could be manufactured into objects by this procedure, would be a great advantage, since these resins have special characteristics as compared to phenolic resins; for example, their physical strength and shock resistances, when substantially fully cured, are considerably better than are obtained with phenolic resins, and their chemical resistance is not only superior to the phenolic resins, but is far more extensive. For instance, the phenolic resins are not resistant to caustic alkalies, and their resistance to solvents is not very great, acetone, for example, attacking most phenol resins very badly. The furfuryl alcohol resins are resistant to both acids and bases, including caustic alkalies, and they are not affected by the ordinary solvents.

In order to employ the molding procedure outlined, it is necessary to have an appreciable working life, for example, eight to twelve hours, and preferably longer, during which the resin is in a soft and moldable condition, and for this reason, prior to the present invention, the furfuryl alcohol resins, despite their advantageous properties, could not be employed, since, as pointed out, the conversion of these resins into the final, insoluble, infusible stage could not be controlled when a substantially completely condensed and polymerized product with its advantageous properties was desired.

Furthermore, after the initial condensation of the furfuryl alcohol, a considerable quantity of water and uncombined furfuryl alcohol and other volatile components are tenaciously held in the resin. If these volatile materials are left in the resin when it is converted, they tend to decrease the strength of the material, and since they gradually volatilize over a considerable period at room or elevated temperatures, they cause the product to shrink and to become checked and cracked and to have a high porosity.

One object of the present invention is to provide a convertible furfuryl alcohol resin which may be worked as desired without chance of spontaneous conversion to the infusible, insoluble stage, but which after working may be readily converted by heat into a substantially completely condensed and polymerized infusible, insoluble product.

Another object of the present invention is to provide a method by which the conversion of an initial furfuryl alcohol resin into the substantially completely condensed and polymerized insoluble and infusible product can be controlled so that sufficient time will be provided to permit molding or other desired working of the resin.

A further object of the invention is to provide a process by which large objects may be molded from furfuryl alcohol resins without the necessity of expensive molds, hydraulic presses, and the like.

Another object of the invention is to provide a process for the production of furfuryl alcohol resins which are capable of being transformed into self-supporting chemical resistant structural units of practically any desired size.

Still another object of the invention is to provide a method of producing a substantially completely condensed and polymerized resin by which the residual volatile content of the resin is reduced to a minimum so that difficulties, due to the presence of a high volatile content of the resin, will be avoided.

Other objects, including the provision of furfuryl alcohol resins of novel and advantageous properties, will be apparent from a consideration of this specification and the claims.

In accordance with the present invention, the polymerization of the initial furfuryl alcohol resin is controlled by the use of latent catalytic material, that is a compound or a mixture of compounds, either organic or inorganic, which is neutral or only very faintly acid at room temperature or other relatively low temperatures at which the product is worked and, therefore, does not possess sufficient activity during the working of the resin to cause spontaneous conversion thereof. The latent catalyst need not be completely inactive at the temperature at which the resin is worked prior to the conversion thereof, but the latent catalysts are characterized by the fact that they are not sufficiently active to solidify the resin during the working life thereof, for example, eight hours or longer. It will be understood that the working life may be much longer than eight hours, for example, twenty-four to thirty-six hours, the working life being dependent on the amount and type of latent catalyst and the temperature of the resin. The latent catalytic material employed is effective, however, due to the subsequent liberation of a strong acid in substantial amounts to condense and polymerize the resin into a substantially completely condensed and polymerized product upon completion of the molding or other working of the product, preferably by heating the resin at an elevated temperature, for example, 120° F. to 400° F.–500° F. or higher, termed herein "an elevated temperature," although with relatively large amounts of latent catalytic material, especially in the presence of the strongly acid catalyst as hereinafter described, the resin may be substantially completely condensed and polymerized by permitting the product to stand at room or relatively low temperatures for a very extended period. If desired, instead of subjecting the resin to heat immediately upon completion of the working, the resin may be permitted to solidify at room or relatively low temperatures, followed by treatment at an elevated temperature. Since the latent catalyst is inactive from a practical standpoint during the working of the resin, satisfactory working life is always obtained and subsequently strong acid is produced, preferably by heating the resin, which is capable of producing substantially complete condensation and polymerization of the resin into the infusible, insoluble stage in which the resin is characterized by substantially complete infusibility and insolubility and by low hot strength loss.

The latent catalyst as thus employed in accordance with the present invention may, therefore, be designated as "latent catalytic material which is neutral to slightly acid at room temperature and is inactive to convert the resin during the working prior to the conversion thereof but is effective at least at an elevated temperature to liberate a strong acid capable, when available in a sufficient amount, of providing substantially complete condensation and polymerization of the resin." The total amount of acid available at the time of conversion of the resin into the infusible, insoluble stage, either provided by the latent catalytic material alone or by the latent catalytic material and other acid present, for example, the strongly acid catalyst employed in accordance with the invention to reduce the volatile content of the converted resin as hereinafter described, will be sufficient to provide substantially complete conversion of the resin into a product characterized by substantially complete infusibility and insolubility, and by relatively low hot strength loss. While each of the named properties are characteristic of a substantially completely condensed and polymerized product, either the insolubility or the low hot strength loss of the product may be taken as typical. A furfuryl alcohol resin is deemed to be substantially completely polymerized when the loss in flexural strength of a product tested at 212° F. as compared with the flexural strength at 75° F. is less than 35%, the flexural strength being determined as follows:

A test specimen is prepared by thoroughly mixing the initial furfuryl alcohol resin containing the latent catalyst with an equal amount by weight of long fibred asbestos. The resulting pasty mixture is then loaded into a mold by tamping or rolling, the mold being of a size to provide a specimen one inch thick by one inch wide by twelve inches long. The composition is cured in the mold for twelve hours under 100 pounds per square inch pressure at 290° F. After the curing of the resin, the specimen is removed from the mold and sanded and sawed into two halves, each six inches in length, one half being used for testing the flexural strength at 75° C. and the other for testing the flexural strength at 212° C. after the specimen is brought to a uniform temperature throughout by heating in an oil bath. The flexural test is made in a standard Olsen Universal Testing Machine with the supports five inches apart in a manner well known in the testing art.

Referring to the insolubility of the polymerized product, a furfuryl alcohol resin is deemed to be substantially completely condensed and polymerized when a product produced as described in connection with the above discussion of the hot strength loss is tested in accordance with "A. S. T. M. designation D494–41" as published in "A. S. T. M. Standards on Electrical Insulating Materials" (February 1944), page 126 et seq., and the acetone extractable matter is less than about 3%.

In the production of articles by the procedure described in "The Chemistry of Synthetic Resins" supra, for example, the use of a resin capable of being converted into a substantially completely condensed and polymerized resin, is required in order that the necessary self-supporting structure may be obtained. Such a product possesses greater flexural strength, both at room temperature and at 212° F., and materially less loss in strength as the product is heated from 75° F. to 212° F. than has been obtained in the previously known furfuryl alcohol resins. This may be due to the fact that with the latent catalyst, it is possible to liberate a larger amount of strong acid at the time of the polymerization, as compared to the amount of strong acid which could be used directly, since as stated, the use of a relatively large amount of strong acid results in practically instantaneous formation of the insoluble, infusible resin.

In another embodiment of the invention where a substantially completely polymerized product with a minimum of residual volatile content with its attendant advantages is desired, the latent catalytic material providing the substantially completely polymerized product is employed in conjunction with a very small amount of a strongly acidic catalyst. The amount of strong acid catalyst present is insufficient to cause conversion of the resin during the working thereof and, hence, is insufficient to cause complete and satisfactory conversion of the resin at elevated temperatures. It is believed that the small amount of strong acid catalyst binds an appreciable part of the volatile material, for example, by condensing the unreacted furfuryl alcohol during the working of the resin and during the time the product is being heated to the elevated temperature at which the latent catalyst functions. In view of the fact that the amount of strong acid catalyst employed with the latent catalyst is insufficient to convert the resin at the temperatures used in working the resin, its presence does not reduce the working life of the resin, although its presence renders the resin mixture somewhat corrosive.

The initial furfuryl alcohol resin to which the latent catalyst is added may be any initial resin which is insufficiently acid to be convertible at room or other relatively low temperature at which the product is worked prior to the conversion thereof. The original condensation of the furfuryl alcohol may, therefore, be brought about by a strong or by weak acid. As previously pointed out, a substantially complete condensation and polymerization of the resin cannot be obtained by the use of a weak acid and cannot be obtained when a strong acid is used in a small enough amount to provide a satisfactory working life, and for these reasons the initial resin will not be convertible, in the absence of the latent catalytic material, into a substantially completely condensed and polymerized product. In the event the acidity of the initial condensation product is sufficiently high so that the initial resin possesses a tendency for spontaneous conversion, the conversion to the final infusible, insoluble stage will be arrested by removal of at least sufficient of the acid to render the resin non-convertible during the working thereof. The removal of the acid is advantageously accomplished by neutralization but if desired the initial resin may be washed with water until the acidity has been reduced to the desired point.

In the now preferred embodiment of the invention, the initial condensation of the furfuryl alcohol is brought about by a strong acid such as sulphuric acid, hydrochloric acid, benzene or toluene sulphonic acid, or a sulphur chloride, followed by neutralization of substantially all of the acid by means of a basic substance such as caustic soda or potash, ammonium hydroxide, lime, an organic base, or the like. The neutralized resin is substantially nonreactive and can be stored for months, even in hot weather, without substantial increase in viscosity. In view of the fact that the latent catalyst is also neutral to slightly acid, a mixture of the substantially neutral resin and the latent catalyst can be mixed and stored in non-specialized equipment with assurance that the metal or other parts will not be subjected to appreciable corrosion during the working or storage of the resin. The progress of the initial condensation of the furfuryl alcohol may advantageously be controlled by the addition of water as the temperature rises, and when a product of the desired viscosity is obtained, the reaction may be quenched by the addition of a further quantity of water, followed by neutralization. The resin so formed is preferably allowed to settle, and the separated water is removed. Thereafter, the resin is advantageously distilled under vacuum to remove volatile material and to increase the viscosity. A method for producing an initial condensation product from furfuryl alcohol is the subject-matter of copending application Serial Number 547,971, filed August 3, 1944, now Patent Number 2,416,038.

If desired, for economic or other reasons, furfural may be included with the furfuryl alcohol in the polymerization of the initial resin, but so far as the properties of the product are concerned, there is no advantage to be gained. If furfural is included, it may be present in amounts up to about 15% without deleteriously affecting the properties of the product. The conditions of reaction and the like described herein for the preparation of a product containing furfuryl alcohol are applicable for mixtures of furfuryl alcohol and up to about 15% of furfural.

The latent catalyst may be selected from a wide variety of compounds which are inactive to polymerize the initial furfuryl alcohol resin during the working thereof, but which subsequently, and preferably under the action of heat, in the presence of the initial resin, split off or otherwise produce a strongly acid substance which is capable, when a sufficient amount of latent catalyst has been employed, of substantially completely converting the resin to its final, substantially insoluble, infusible form. Among the latent catalysts available for use are the following classes of materials: (a) the aromatic sulphonchlorides, such as paratoluene sulphonchloride, para acetyl amino benzene sulphonchloride, and the like; and (b) the aliphatic-amine and ammonium salts of the aromatic sulphonic acids, such as ammonium paratoluene sulphonate, dimethyl amino benzene sulphonate, diethyl amino toluene sulphonate, ammonium benzene sulphonate and disulphonate, ammonium phenol sulphonate, ammonium naphthalene sulphonate, ammonium anthracene sulphonate and disulphonate, ammonium sulphanilate, and the like.

The effectiveness of the latent catalyst is dependent upon the particular catalyst selected; for example, the acid is liberated from ammonium paratoluene sulphonate more completely, more easily, and more rapidly than from ammonium benzene sulphonate, with the result that larger amounts of the last named catalyst are required to obtain substantially complete conversion. In any particular case, the amount of latent catalyst employed will be determined by the amount of the strong acid required at the time of the conversion to convert the resin into a substantially completely condensed and polymerized product. The strength and amount of the acid produced, the speed with which it is produced, and the amount of acid available at the time of conversion from sources other than the latent catalyst will necessarily be taken into consideration in determining the amount of latent catalyst to be added to the initial resin. Of the various latent catalysts available, the use of an aromatic sulphonchloride or of one of the aliphatic-amine or ammonium salts of an aromatic sulphonic acid, capable of liberating quickly large amounts of a relatively strong acid (such as ammonium paratoluene sulphonate) is preferred, although any other latent catalyst which acts in a similar manner may be employed. In the production of the substantially completely condensed and polymerized product, the amount of latent catalyst generally employed, when substantially all of the acid required for conversion is provided by the latent catalytic material, will be between about 3% and about 12% to 15%, the use of between about 4% and 10% being usually preferred. Excess over that required is not generally disadvantageous except that it represents a waste of material.

In the table hereafter set forth, a comparison is given of the effect on the resin of certain catalysts which are not of the type of the latent catalysts employed in accordance with the present invention, and of latent catalysts of the invention. In preparing the samples for test, a non-reactive furfuryl alcohol resin was prepared as described below and the catalysts in the amounts given were then added thereto, the test specimens containing equal amounts of resin and long fibred asbestos were prepared and treated in accordance with the description hereinbefore set forth in connection with the determination of the hot strength loss. The non-reactive resin was prepared as follows:

150 pounds of furfuryl alcohol were refluxed with 15% by volume of the furfuryl alcohol of a solution of sulphuric acid in water of 10 grams/liter concentration. The exact amount of sulphuric acid was adjusted so that the hydrogen ion concentration of the mixture was approximately 1.6. The material was refluxed for approximately thirty minutes, at the end of which time a little more sulphuric acid was added to bring the pH back to 1.6. It was then refluxed for another period of about thirty to forty-five minutes, following which the material was neutralized by the addition of sodium hydroxide. Then the entire mixture was distilled under vacuum to a temperature of about 145° C. A resin with comparable properties may be prepared by omitting the second addition of acid; in which case, the resin is neutralized immediately and then distilled.

TABLE I

| No. | Catalyst Used | Amount of Catalyst | Satisfactory Working Life | Flexural Strength 75° F. | Flexural Strength 212° F. | Strength Loss |
|---|---|---|---|---|---|---|
| | | Per cent | Hours | | | Per cent |
| 1 | H₂SO₄ | 0.1 | 8 | 2,337 | 681 | 70.7 |
| 2 | do | 0.2 | 8 | 4,164 | 1,011 | 75.6 |
| 3 | do | 0.3 | 6 | 5,738 | 1,546 | 73.0 |
| 4 | do | 0.4 | 3 | 5,800 | 1,487 | 74.3 |
| 5 | do | 0.5 | 2 | 6,170 | 1,523 | 75.3 |
| 6 | HCl | 0.6 | 2 | 8,164 | 4,693 | 42.5 |
| 7 | H₃PO₄ | 2.0 | 12 | 4,586 | 1,304 | 71.6 |
| 8 | Ethyl Phosphoric Acid | 4.0 | 12 | 6,060 | 1,577 | 73.8 |
| 9 | Maleic Acid | 4.0 | 48 | 5,946 | 1,522 | 74.5 |
| 10 | do | 7.0 | 24 | 7,366 | 3,280 | 55.5 |
| 11 | do | 10.0 | 24 | 6,512 | 3,758 | 42.2 |
| 12 | Aniline Sulphate | 4.0 | 24 | 5,852 | 1,760 | 70.0 |
| 13 | Paratoluene Sulphonchloride | 4.0 | 24 | 6,896 | 5,521 | 19.9 |
| 14 | do | 6.0 | 24 | 9,532 | 7,746 | 18.7 |
| 15 | do | 8.0 | 24 | 8,346 | 7,156 | 14.3 |
| 16 | P-acetyl Amino Benzene Sulphonchloride | 4.0 | 48 | 8,700 | 6,700 | 23.0 |
| 17 | Ammonium p-toluene Sulphonate | 4.0 | 48 | 9,106 | 6,076 | 33.3 |
| 18 | do | 8.0 | 24 | 8,742 | 6,328 | 27.6 |
| 19 | Ammonium Benzene Sulphonate | 4.0 | 24 | 8,432 | 4,368 | 48.2 |
| 20 | Ammonium Sulphanilate | 4.0 | 24 | 9,064 | 3,952 | 56.5 |
| 21 | Ammonium Phenol Sulphonate | 4.0 | 24 | 7,888 | 3,032 | 61.5 |

Referring to the table, it is to be noted that the flexural strength at 75° F. of Numbers 1 to 5, where sulphuric acid was used as a catalyst, increases with increasing acid, but that in all cases the loss in strength at 212° F. is substantial. The amount of acid cannot be increased, since as small an amount as 0.5% acid caused the spontaneous conversion of the resin in only two hours. In the case of hydrochloric acid (Number 6), the results are somewhat better, but the hot strength loss is still serious and the working life of two hours is nowhere near sufficient to permit commercial operations. Numbers 7 to 12 are typical of the results obtained where the conversion is brought about by an acid of insufficient strength to provide substantially complete condensation and polymerization. These catalysts give a useful working life, but substantially complete conversion is not obtained even when they are used in substantial amounts. Numbers 13 to 15 show that paratoluene sulphonchloride gives a substantially completely condensed and polymerized resin of a high degree of infusibility and insolubility with very satisfactory working life, excellent physical strength, and low loss at 212° F., the loss of 14-20% being much better than can be achieved with ordinary or conventional catalysts, and representing a satisfactory commercial product, not possible following the known procedures of the art. Numbers 16 to 18 are also excellent and are of an order of quality only slightly below Numbers 13 to 15. Numbers 19 to 21 illustrate the use of latent catalysts in insufficient amount to furnish the amount of strong acid required for substantially complete condensation and polymerization as shown by the serious hot strength loss. As previously pointed out, however, the catalysts of Numbers 19 to 21 may be used in accordance with the invention when employed in sufficient amount or when used in conjunction with the strongly acid catalyst as herein described.

In the embodiment of the invention, where a substance of strong acidic reaction in an insufficient amount to cause conversion of the initial resin during the working thereof, is employed with the latent catalyst, the acid may be any inorganic or organic material capable, if used in sufficient amounts, of satisfactorily converting the resin. The use of sulphuric acid is preferred, and hydrochloric acid, the sulphur chlorides, benzene and toluene sulphonic acids are other typical examples. The strong acid catalyst may be mixed with the initial resin simultaneously with or prior or subsequent to the latent catalytic material or if the initial condensation is brought about by the use of a strong acid catalyst, the initial resin may have associated with it, following partial neutralization if required, the desired amount of strong acid catalyst. The claims, which refer to the mixing of the latent catalyst with an initial resin containing a strongly acid catalyst in an amount ineffective to convert the resin during the working prior to the conversion thereof, include these various methods by which the strongly acid catalyst may become associated with the initial resin. The amount of strongly acidic substance employed is controlled so that the initial resin will not be spontaneously converted, and usually the amount of acid substance used is between about 0.05% and about 0.4% by weight based on the weight of the initial resin, the use of between about 0.1% and about 0.2% being generally preferred. The amount of latent catalytic material employed with the strongly acid catalyst will be sufficient to provide with the strongly acid catalyst the amount of acid required to provide substantially complete condensation and polymerization, for example, about 0.5% to about 2%, although in this instance also an excess over the amount required is not disadvantageous except as it involves a waste of material.

In Table II hereinafter set forth, the effect of the presence of a small amount of strongly acidic substance with the latent catalyst is shown. A non-reactive resin was prepared in the manner described in connection with the examples of Table I. The samples of Table II were prepared by mixing together the required quantities of non-reactive resin, latent catalyst, and sulphuric acid. A portion of each of the initial resins was placed in a test tube and the resin was hardened by baking at an elevated temperature in the vicinity of 285° F. under a pressure of about 7 to 8 atmospheres for approximately twenty-four hours. Another portion of each resin was placed in an open dish at room temperature and the working life of the resin observed. The total volatile of each initial resin was separately determined by spreading a 3 gram sample of resin over the surface of a shallow dish of about two inches diameter and heating without pressure for twenty-four hours at 150° C.

TABLE II

| H₂SO₄, Per Cent | Paratoluene Sulphonchloride, Per Cent | Total Vol. | Working Life | Condition of Hardened Resin | Hot | Comments |
|---|---|---|---|---|---|---|
| 0 | 0 | 28.10 | | Completely soft | | Non-convertible |
| 0.1 | 0 | 10.29 | Satisfactory | Very elastic, brittle | | Only partly converted |
| 0.2 | 0 | 8.52 | do | Elastic, brittle | | Do. |
| 0.4 | 0 | 8.44 | Not good | do | | Do. |
| 0.6 | 0 | 9.08 | do | do | | Do. |
| 0 | 0.5 | 13.37 | Satisfactory | Elastic, fairly strong | | Partly converted |
| 0 | 1.0 | 13.71 | do | Sl. elastic, strong | | Fair but incomplete conversion |
| 0 | 2.0 | 12.84 | do | Hard and strong | | Substantially fully converted |
| 0 | 3.0 | 13.00 | do | do | | Do. |
| 0 | 4.0 | 13.19 | do | do | | Do. |
| 0.1 | 0.5 | 10.57 | Satisfactory | Hard and strong | | Fair but incomplete conversion |
| 0.1 | 1.0 | 9.90 | do | do | | Substantially fully converted |
| 0.1 | 2.0 | 10.51 | do | do | | Do. |
| 0.1 | 3.0 | 10.60 | do | do | | Do. |
| 0.1 | 4.0 | 11.43 | do | do | | Do. |
| 0.2 | 0.5 | 8.51 | Satisfactory | Hard, strong | | Substantially fully converted |
| 0.2 | 1.0 | 7.95 | do | do | | Do. |
| 0.2 | 2.0 | 8.69 | do | do | | Do. |
| 0.2 | 3.0 | 9.07 | do | do | | Do. |
| 0.2 | 4.0 | 9.18 | do | do | | Do. |

As shown by the above table, with sulphuric acid alone, full conversion and polymerization was not obtained even with 0.6%, and yet with 0.4% the working life was not good. The volatile, however, went down rapidly and then seemed to achieve an equilibrium. With paratoluene sulphonchloride alone, the working life was satisfactory and a complete conversion was obtained when a sufficient amount of the latent catalyst was employed. The volatile content, however, was higher than with the samples to which sulphuric acid was added. The combination of the strong acidic material with the latent catalyst, however, gave a volatile content corresponding to that of sulphuric acid alone and the working life and convertibility were satisfactory, the working life approaching the doubtful range with 0.4% sulphuric acid. It is also to be noted that in the case of the latent catalyst and the combination of the latent catalyst and the strongly acidic material, there is substantially no change in the volatile with increasing amounts of catalyst. As shown by the table, the total volatile content of the resin in its non-convertible state was 28.10%, and while this is rather a high volatile, the results are similar with resins of lower initial volatile, although quantitatively less striking.

The non-reactive resin containing the latent catalyst, with or without the strongly acidic material, may be worked in any of the various ways employed in the art. The term "working" as employed herein and in the claims includes any of the procedures of the art for utilizing an initial fusible, soluble resin, with or without a filling material, such as the preparation of a molding powder; the preparation of a pasty composition for molding in accordance with the process described in "The Chemistry of Synthetic Resins," supra; the preparation of a solution or varnish and the impregnation of materials thereby; and the like. Since there is a tendency for strong latent catalysts alone or with an active acidic catalyst to decompose cellulosic filling materials, the use of a filling material inert to acid is employed where the tendency toward decomposition is disadvantageous.

Thus, the initial resin to which the latent catalyst has been added may be mixed with various fillers such as asbestos, glass, graphite, slate dust, quartz, wool, and the like, or such cellulosic fillers as wood flour where the tendency for degradation of the cellulose is not significant. The mixture of resin and filler may then be formed into a molding powder by drying in an oven or by the use of compounding rolls and the molding powder may then be placed in a mold and the resin cured by the application of heat and pressure, for example, a temperature of from 130° F. to 400° F. and a pressure of 500 pounds to 5,000 pounds per square inch.

A pasty mixture of the initial resin, fibrous asbestos or other filler and the latent catalyst, for example, 4% to 6% of paratoluene sulphonchloride, may also be molded into large objects of the type described in "The Chemistry of Synthetic Resins," supra, by the same method as that at present employed with phenolic resins. The resin may comprise 25% to 70% of the total weight preferably from 45% to 55%, the balance being the fibrous asbestos or other filler. As before stated, the pasty composition in this case is filled into molds or forms of sheet metal, wood, and the like, by spinning, stamping, or otherwise forming at room temperature. The molds or forms are then placed in an autoclave and baked, under pressure if desired. The temperature of baking may vary from about 130° F. to about 400° F., a temperature of about 250° F. to 300° F. usually being employed. The length of time of baking may vary from about one to about seventy-two hours, a baking time of between about eight and about twenty-four hours being generally satisfactory. If pressure is employed, any amount up to 250 pounds per square inch or more may be used, preferably between about 90 and 120 pounds per square inch. This method is particularly applicable for the construction of large chemical equipment, such as tanks, towers, pipes, and other items required by the industries to overcome corrosion. The considerable advantage in strength, toughness, and chemical resistance possessed by the substantially completely condensed and polymerized furfuryl alcohol resins makes this equipment more valuable commercially than previously known products.

The initial furfuryl alcohol resin may also be dissolved in an appropriate solvent such as benzene, toluene, acetone, or mixtures thereof, to form a varnish and the latent catalyst, and strongly acidic material if employed, may be present with the resin when it is dissolved, or may be added to the solution of the resin. This solution or varnish may be employed in the coating, impregnating, and laminating fields for the treatment of asbestos and glass paper or fabrics, or of paper or cloth made of cellulosic materials where the tendency for degradation of the cellulose is unimportant. The coated impregnated or laminated material may subsequently be cured by treating the material under appropriate heat and/or heat and pressure conditions, for example, a temperature of 140 F. to 400° F. and a pressure of 500 pounds to 5,000 pounds per square inch.

As above stated, the initial non-reactive resin to which the latent catalyst is to be added may be prepared by any suitable method, for example, the method hereinbefore set forth in connection with the preparation of the samples of Table I. The following is another example of the preparation of a non-reactive resin:

Example 1

To 100 lbs. (10.6 gals.) furfuryl alcohol (or a mixture of furfuryl alcohol and furfural containing up to 15% furfural) is added 13.6 lbs. (1.59 gals.) of a solution of 50 grams/liter $H_2SO_4$, in a tank equipped for agitation. The temperature will rise to about 50° C. in about ten minutes. At this point, 10 lbs. (1.2 gals.) of water are added, which tends to reduce the speed of reaction. The temperature will continue to rise, and at 70° C., 90° C., and 100° C. 10 lbs. (1.2 gals.) portions of water are added as before. The resin is allowed to react at 100° C., adding further water if necessary to control the violence of the reaction, until the proper viscosity is obtained, usually in about ten–twenty minutes. When this point is reached, 50 lbs. (6.0 gals.) of water are suddenly added to "quench" the reaction, followed by 0.6 lbs. of NaOH dissolved in 3.5 lbs. water. The resin is allowed to settle and the supernatent water is siphoned off. Then the resin is transferred to a still and is distilled under 26"–29" vacuum to a temperature of 125° C. to 145° C. The resin so produced has a viscosity similar to that of molasses. It is substantially non-reactive and can be stored for several months, even in hot weather, without appreciable increase in viscosity. It becomes reactive again in the presence of an acidic material.

The following examples are illustrative of the utilization of the initial non-reactive resin of Example 1 in conjunction with the latent catalyst in accordance with the invention:

Example 2

100 lbs. of the furfuryl alcohol resin is placed in a dough-type mixer and is mixed with 110 lbs. of fibrous asbestos and 4 lbs. of paratoluene sulphonchloride. This continues for about ten minutes, preferably under vacuum. The resultant pasty mixture is loaded into molds or onto mandrels by rolling, spinning, stamping, etc., the molds being simply constructed of sheet steel. The loaded molds are placed in an autoclave and the whole is baked at about 290° F. at 110 lbs.

per square inch pressure for about twelve hours. After cooling, the molds are removed, and finishing operations, such as sanding, lacquering, and machining operations are performed. In this manner, large or small tanks, towers, pipes, and similar items can be produced.

Example 3

The procedure of Example 2 is followed except that 4 lbs. of ammonium paratoluene sulphonate is employed as the latent catalyst.

Example 4

100 lbs. of the initial resin, 100 lbs. of fibrous asbestos, and 6 lbs. of ammonium paratoluene sulphonate are mixed in a dough mixer about ten minutes under vacuum. The resulting mixture is molded and hardened in the same manner as in Example 2.

Example 5

100 lbs. of the initial resin, 110 lbs. of fibrous asbestos, 6 lbs. of paratoluene sulphonchloride, and 0.1 lbs. of $H_2SO_4$ dissolved in 1 lb. of furfural are mixed together. The procedure of Example 2 is then followed.

Example 6

100 lbs. of the initial resin, 120 lbs. of powdered graphite, 5 lbs. of paraacetyl amino benzene sulphonchloride, and 0.08 lb. of concentrated HCl solution diluted with 1 lb. of denatured alcohol are mixed for fifteen minutes in a dough mixer under vacuum. The mixture is molded and hardened as described in Example 2. Equipment produced in this way is suitable for resistance to HF.

Example 7

100 lbs. of the viscous non-reactive resin made from a 90-10 mixture of furfuryl alcohol and furfural, 120 lbs. of powdered graphite, and 6 lbs. of ammonium paratoluene sulphonate are mixed, molded, and baked, and removed from the mold in the same manner as described in Example 6.

Example 8

100 lbs. of the viscous non-reactive furfuryl alcohol resin, 100 lbs. of fibrous asbestos, 4 lbs. of paratoluene sulphonchloride, 6 lbs. of calcium stearate, and 2 lbs. of carbon black are mixed together in a dough mixer for about ten minutes. The resulting pasty mass is rolled out into sheets from $\frac{1}{16}$" to 1" thick, which are then dried in an oven at about 170° F. for long enough to advance the cure to the desired point—usually about one-six hours. After cooling, the sheets which are now solid at room temperature, but which soften when hot, are broken up into convenient sizes and are molded in closed molds in a hydraulic press at about 350° F. and 2000 lbs. per square inch pressure. The molds should be constructed from a metal that will not be affected by the acid of the latent catalyst agent.

Example 9

The pasty primary mixture from Example 8, instead of being dried in an oven, is transferred to hot compounding rolls, where it is worked until sufficiently advanced in cure. The resulting material, when cold, is broken up and ground to the desired degree of fineness. It can then be molded, either in powder form or after compression into tablets, in the same manner as in Example 8.

Example 10

100 lbs. of the viscous non-reactive furfuryl alcohol resin, 100 lbs. of wood flour, 8 lbs. of ammonium benzene sulphonate, 6 lbs. of calcium stearate, and 4 lbs. of nigrosine dye are mixed thoroughly. The compound is then compacted and advanced to the proper state of cure on heated compounding rolls. The product is cooled, ground, and molded in the same general manner as in Examples 8 and 9.

Example 11

A varnish or lacquer is produced by dissolving the non-reactive furfuryl alcohol resin in an appropriate solvent or solvents, such as benzene, toluene, acetone, or the like. The latent catalyst, paratoluene sulphonchloride is also dissolved in the mixture or is added in a separate solution. The solution contains about 50% resin and about 4% of latent catalyst based on the resin. Paper, cloth, or similar material (including asbestos fabric or paper and glass fabric) is passed through the solution to impregnate it. Then it is dried in a continuous strip in long ovens with rapidly circulating hot air, to remove the solvent and to advance the cure to the desired point. The material is then cut into appropriate size sheets, which are stacked between metal plates and pressed between the platens of a hydraulic press at 350° F. and 2000 lbs. per square inch pressure.

Considerable modification is possible in the selection of the latent catalyst and the strongly acidic material if employed, as well as in the amounts thereof used and in methods of working the initial resin, without departing from the essential features of the invention.

We claim:

1. The process of preparing a convertible furfuryl resin composition, capable of utilization in the initial stage of condensation in the formation of articles therefrom and of subsequent conversion into the infusible, insoluble stage which comprises intimately mixing, with an initial resinous condensation product from which at least sufficient water has been removed to provide a viscous product and of insufficient acidity to be convertible during the utilization thereof in the formation of articles therefrom, said initial resinous condensation product being selected from the group consisting of furfuryl alcohol initial condensation products and initial condensation products of furfuryl alcohol and not more than about 15% furfural, an amount of latent catalytic material selected from the group consisting of dimethyl amino benzene sulphonate, diethyl amino toluene sulphonate, ammonium benzene sulphonate, ammonium benzene disulphonate, ammonium phenol sulphonate, ammonium naphthalene sulphonate, ammonium anthracene sulphonate, ammonium anthracene disulphonate, ammonium sulphanilate, ammonium paratoluene sulphonate, paratoluene sulphonchloride, and para acetyl amino benzene sulphon chloride, which is sufficient to cause, upon heating, condensation and polymerization of the resin into the infusible, insoluble stage characterized by a loss in flexural strength at 212° F., as compared with the flexural strength at 75° F., of less than 35%, when tested in accordance with the test set forth in the specification hereof.

2. The process of claim 1 wherein paratoluene sulphonchloride is mixed with the initial resinous condensation product.

3. The process of claim 1 wherein ammonium paratoluene sulphonate is mixed with the initial resinous condensation product.

4. The process of claim 1 wherein ammonium benzene sulphonate is mixed with the initial resinous condensation product.

5. The process of preparing a convertible furfuryl resin composition, capable of utilization in the initial stage of condensation in the formation of articles therefrom and of subsequent conversion into the infusible, insoluble stage which comprises intimately mixing, with an initial resinous condensation product from which at least sufficient water has been removed to provide a viscous product and of insufficient acidity to be convertible during the utilization thereof in the formation of products therefrom containing a strong acid in an amount from about 0.05% to about 0.4%, said initial resinous condensation product being selected from the group consisting of furfuryl alcohol initial condensation products and initial condensation products of furfuryl alcohol and not more than about 15% furfural, an amount of latent catalytic material selected from the group consisting of dimethyl amino benzene sulphonate, diethyl amino toluene sulphonate, ammonium benzene sulphonate, ammonium benzene disulphonate, ammonium phenol sulphonate, ammonium napthhalene sulphonate, ammonium anthracene sulphonate, ammonium anthracene disulphonate, ammonium sulphanilate, ammonium paratoluene sulphonate, paratoluene sulphonchloride, and para acetyl amino benzene sulphonchloride, which is sufficient, to cause, upon heating and in conjunction with said strong acid, condensation and polymerization of the resin into the infusible, insoluble stage characterized by a loss in flexural strength at 212° F., as compared with the flexural strength at 75° F., of less than 35% when tested in accordance with the test set forth in the specification hereof.

6. The process of preparing a furfuryl resinous product in the infusible, insoluble stage which comprises intimately mixing, with an initial resinous condensation product from which at least sufficient water has been removed to provide a viscous product and of insufficient acidity to be convertible during the utilization thereof in the formation of articles therefrom, said initial resinous condensation product being selected from the group consisting of furfuryl alcohol initial condensation products and initial condensation products of furfuryl alcohol and not more than about 15% furfural, an amount of latent catalytic material selected from the group consisting of dimethyl amino benzene sulphonate, diethyl amino toluene sulphonate, ammonium benzene sulphonate, ammonium benzene disulphonate, ammonium phenol sulphonate, ammonium naphthalene sulphonate, ammonium anthracene sulphonate, ammonium anthracene disulphonate, ammonium sulphanilate, ammonium paratoluene sulphonate, paratoluene sulphonchloride, and para acetyl amino benzene sulphonchloride, which is sufficient, to cause, upon heating, condensation and polymerization of the resin into the infusible, insoluble stage characterized by a loss in flexural strength at 212° F., as compared with the flexural strength at 75° F., of less than 35% when tested in accordance with the test set forth in the specification hereof; forming an article from said mixture; and subjecting said article to heat to convert said resin into said infusible, insoluble stage.

7. The process of claim 6 wherein paratoluene sulphonchloride is mixed with the initial resinous condensation product.

8. The process of claim 6 wherein ammonium paratoluene sulphonate is mixed with the initial resinous condensation product.

9. The process of claim 6 wherein ammonium benzene sulphonate is mixed with the initial resinous condensation product.

10. The process of preparing a furfuryl resinous product in the infusible, insoluble stage, which comprises intimately mixing, with an initial resinous condensation product from which at least sufficient water has been removed to provide a viscous product and of insufficient acidity to be convertible during the utilization thereof in the formation of articles therefrom containing a strong acid in an amount from about 0.05% to about 0.4%, said initial resinous condensation product being selected from the group consisting of furfuryl alcohol initial condensation products and initial condensation products of furfuryl alcohol and not more than about 15% furfural, an amount of latent catalytic material selected from the group consisting of dimethyl amino benzene sulphonate, diethyl amino toluene sulphonate, ammonium benzene sulphonate, ammonium benzene disulphonate, ammonium phenol sulphonate, ammonium naphthalene sulphonate, ammonium anthracene sulphonate, ammonium anthracene disulphonate, ammonium sulphanilate, ammonium paratoluene sulphonate, paratoluene sulphonchloride, and para acetyl amino benzene sulphonchloride, which is sufficient, to cause, upon heating and in conjunction with said strong acid, condensation and polymerization of the resin into the infusible, insoluble stage characterized by a loss in flexural strength at 212° F., as compared to the flexural strength at 75° F., of less than 35% when tested in accordance with the test set forth in the specification hereof; forming an article from said mixture; and subjecting said article to heat to convert said resin into said infusible, insoluble stage.

11. A furfuryl resinous composition capable of utilization in the initial stage of condensation in the formation of articles therefrom and of subsequent conversion into the infusible, insoluble stage comprising an intimate mixture of an initial resinous condensation product selected from the group consisting of furfuryl alcohol initial condensation products and initial condensation products of furfuryl alcohol and not more than about 15% furfural, from which at least sufficient water has been removed to provide a viscous product and of insufficient acidity to be convertible during the utilization thereof in the formation of articles therefrom, and an amount of latent catalytic material selected from the group consisting of dimethyl amino benzene sulphonate, diethyl amino toluene sulphonate, ammonium benzene sulphonate, ammonium benzene disulphonate, ammonium phenol sulphonate, ammonium naphthalene sulphonate, ammonium anthracene sulphonate, ammonium anthracene disulphonate, ammonium sulphanilate, ammonium paratoluene sulphonate, paratoluene sulphonchloride, and para acetyl amino benzene sulphonchloride, which is sufficient to cause, upon heating, condensation and polymerization of the resin into the infusible, insoluble stage characterized by a loss in flexural strength at 212° F., as compared to the flexural strength at 75° F., of less than 35%, when tested in accordance with the test set forth in the specification hereof.

12. A furfuryl resinous composition capable of utilization in the initial stage of condensation in the formation of articles therefrom and of subsequent conversion into the infusible, insoluble stage comprising an intimate mixture of an initial resinous condensation product selected from the group consisting of furfuryl alcohol initial condensation products and initial condensation products of furfuryl alcohol and not more than about 15% furfural, from which at least sufficient water has been removed to provide a viscous product and of insufficient acidity to be convertible during the utilization thereof in the formation of articles therefrom containing a strong acid in an amount from about 0.05% to about 0.4%, and an amount of latent catalytic material selected from the group consisting of dimethyl amino benzene sulphonate, diethyl amino toluene sulphonate, ammonium benzene sulphonate, ammonium benzene disulphonate, ammonium phenol sulphonate, ammonium naphthalene sulphonate, ammonium anthracene sulphonate, ammonium anthracene disulphonate, ammonium sulphanilate, ammonium paratoluene sulphonate, paratoluene sulphonchloride, and para acetyl amino benzene sulphonchloride, which is sufficient to cause, upon heating and in conjunction with said strong acid, condensation and polymerization of the resin into the infusible, insoluble stage characterized by a loss in flexural strength at 212° F., as compared with the flexural strength at 75° F., of less than 35%, when tested in accordance with the test set forth in the specification hereof.

WILLIAM H. ADAMS, JR.
HANS H. LEBACH.

REFERENCES CITED

The following references are of record in the file of this patent:

UNITED STATES PATENTS

| Number | Name | Date |
|---|---|---|
| 1,665,235 | Trickey | Apr. 10, 1928 |
| 2,300,812 | Rust | Nov. 3, 1942 |
| 2,321,493 | Korten | June 8, 1943 |
| 2,323,333 | Kauth | July 6, 1943 |
| 2,343,973 | Harvey | Mar. 14, 1944 |
| 2,345,966 | Fiedler | Apr. 4, 1944 |
| 2,366,049 | Payne | Dec. 26, 1944 |
| 2,383,793 | Harvey | Aug. 28, 1945 |
| 2,399,055 | Nordlander | Apr. 23, 1946 |